(12) United States Patent
Mohindra et al.

(10) Patent No.: US 7,945,671 B2
(45) Date of Patent: *May 17, 2011

(54) METHOD AND APPARATUS FOR MIDDLEWARE ASSISTED SYSTEM INTEGRATION IN A FEDERATED ENVIRONMENT

(75) Inventors: Ajay Mohindra, Yorktown Heights, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/114,387

(22) Filed: May 2, 2008

(65) Prior Publication Data
US 2008/0275935 A1 Nov. 6, 2008

Related U.S. Application Data

(63) Continuation of application No. 11/453,507, filed on Jun. 15, 2006, now Pat. No. 7,519,711.

(51) Int. Cl.
*G06F 15/173* (2006.01)
(52) U.S. Cl. ........................ 709/226; 709/223
(58) Field of Classification Search .............. 709/226, 709/223
See application file for complete search history.

(56) References Cited

U.S. PATENT DOCUMENTS

| | | | |
|---|---|---|---|
| 6,286,047 B1 | 9/2001 | Ramanathan et al. | |
| 6,330,689 B1 * | 12/2001 | Jin et al. | 714/15 |
| 6,330,710 B1 | 12/2001 | O'Neil et al. | |
| 6,901,442 B1 * | 5/2005 | Schwaller et al. | 709/224 |
| 7,013,461 B2 | 3/2006 | Hellerstein et al. | |
| 7,181,743 B2 * | 2/2007 | Werme et al. | 718/104 |
| 7,243,306 B1 | 7/2007 | Joshi et al. | |
| 7,340,654 B2 | 3/2008 | Bigagli et al. | |
| 7,343,601 B2 | 3/2008 | Azagury et al. | |
| 7,366,768 B2 | 4/2008 | Deo et al. | |
| 7,464,154 B2 | 12/2008 | Dick et al. | |
| 7,668,741 B2 * | 2/2010 | Ernest et al. | 705/7 |

(Continued)

FOREIGN PATENT DOCUMENTS

EP 1548586 A 6/2005

OTHER PUBLICATIONS

Goldsack et al., "SmartFrog: Configuration and Automatic Ignition of Distributed Applications", May 29, 2003, HP OVUA 2003, pp. 1-9.

(Continued)

*Primary Examiner* — Kristie D Shingles
(74) *Attorney, Agent, or Firm* — Yee & Associates, P.C.; Preston J. Young (57) ABSTRACT

A computer implemented method, data processing system, and computer usable program code are provided for instantiating a service on a network. A service infrastructure manager determines whether a service is available at a requested quality of service in response to receiving a request for the service that specifies the quality of service. The service infrastructure manager performs an analysis of components associated with the service to identify resources needed to create the service in response to the service being unavailable at the requested quality of service. Based on the analysis, the service infrastructure manager allocates resources to support the service and instantiates the service at the requested quality of service after the resources have been allocated.

20 Claims, 7 Drawing Sheets

U.S. PATENT DOCUMENTS

| | | | |
|---|---|---|---|
| 7,694,303 B2 * | 4/2010 | Hahn et al. | 718/104 |
| 7,703,029 B2 * | 4/2010 | Bozak et al. | 715/764 |
| 7,712,100 B2 * | 5/2010 | Fellenstein et al. | 718/104 |
| 2003/0167270 A1 * | 9/2003 | Werme et al. | 707/10 |
| 2004/0003390 A1 | 1/2004 | Canter et al. | |
| 2004/0060054 A1 | 3/2004 | Das et al. | |
| 2004/0103195 A1 * | 5/2004 | Chalasani et al. | 709/226 |
| 2004/0261060 A1 | 12/2004 | Haselden et al. | |
| 2005/0102665 A1 | 5/2005 | Barta et al. | |
| 2005/0138084 A1 | 6/2005 | Azagury et al. | |
| 2006/0195559 A1 | 8/2006 | Winter et al. | |
| 2006/0294238 A1 | 12/2006 | Naik et al. | |
| 2007/0050431 A1 | 3/2007 | Vaidya et al. | |
| 2007/0294364 A1 | 12/2007 | Mohindra et al. | |
| 2007/0294420 A1 | 12/2007 | Mohindra et al. | |
| 2007/0294668 A1 | 12/2007 | Mohindra et al. | |
| 2008/0072220 A1 | 3/2008 | Saffre et al. | |
| 2008/0168424 A1 | 7/2008 | Mohindra et al. | |

OTHER PUBLICATIONS

Anderson, "Towards a High-Level Machine Configuration System", Sep. 19-23, 1994 LISA Conference, San Diego, CA, pp. 19-26.
USPTO office action for U.S. Appl. No. 11/453,509 dated Oct. 29, 2009.
Foster et al., "Grid services for distributed system integration", Computer, vol. 35, No. 6, pp. 37-46, Jun. 2002.
Friese et al., "Hot service deployment in an ad hoc grid environment", ACM, 2004, pp. 75-83.
USPTO office action for U.S. Appl. No. 11/453,514 dated Sep. 16, 2010.
Hashemian et al., "A Graph-Based Approach to Web Services Composition", Proceedings of the 2005 Symposium on Applications and the Internet, Jan. 2005, Trento, Italy, pp. 183-189.
Casati et al., "Adaptive and Dynamic Service Composition in eFlow", 2000, HP Laboratories, Palo Alto, USA, retrieved Sep. 20, 2010 http://www.hpl.hp.com/techreports/2000/HPL-2000-39.pdf.
EP Search report for application EP07796092 dated Sep. 21, 2010.

* cited by examiner

METHOD AND APPARATUS FOR MIDDLEWARE ASSISTED SYSTEM INTEGRATION IN A FEDERATED ENVIRONMENT

This application is a continuation of application Ser. No. 11/453,507 filed Jun. 15, 2006, now U.S. Pat. No. 7,519,711.

BACKGROUND OF THE INVENTION

1. Field of the Invention

The present application relates generally to networked computer systems. More particularly, the present application relates to software and systems management in networked computer environments.

2. Description of the Related Art

Enterprises are increasingly moving towards a grid based computing environment as they strive to contain information technology costs and streamline their businesses through outsourcing of non-core business processes and sharing of distributed resources. The grid infrastructure is emerging to be a common platform for realizing such changes. The grid infrastructure provides middleware services for discovery, naming, messaging, monitoring, and resource brokering.

While grid-based systems can facilitate resource sharing across multiple administrative domains, grid-based systems are much harder to manage from a system administration point of view. One reason for this is that the current state-of-the-art in system management technology has not kept pace with the advances in middleware. Most of the progress has been in managing single or cluster-based systems. Even for such systems, system administrators face a much higher level of complexity when they have to configure and deploy a new service on an existing infrastructure or manage the lifecycle of the existing service and software stack. The situation is much worse in a complex application environment, for example, an environment involving orchestration of a workflow formed by multiple business processes. In such cases, deployment and life cycle management solutions need to take an integrated view of the multiple tiers involved and current system management technologies do not provide the necessary means to build such solutions.

In a federated environment, component services and resources belonging to multiple administrative domains cooperate and coordinate their activities so as to deliver a composite higher level service without violating policies corresponding to individual administrative domains. These federated systems are sometimes referred to as virtual organizations, collective services, on demand clusters, agreement based cooperating systems, and so on. A key characteristic of such systems is that individual components are not dedicated to provide their services to the organization for its entire lifetime, but their commitment to provide the service is limited to a well-defined period of time. Components are constituent elements that form the organizational grid. For example, a component could be a physical box (hardware), an application server instance (software), or a firewall (network).

Often times, the individual components have the liberty to leave the virtual organization with or without prior notice. As a result, the composite federated system must always be prepared to deal with the changes in the service levels offered by individual components as well as asynchronous availability and unavailability of the component services. Traditional system management controls that are designed for dedicated and static cluster-based systems are not geared towards handling such dynamic and continuously evolving systems.

The ability to configure and manage large installations of systems has been an active area of research within the information technology community. The Local Configuration (LCFG) system is a script based system that dynamically configures machines based upon configuration information stored in a central database (Anderson, P., "Towards a High-Level Machine Configuration System," LISA, 1994). The information pertains to network, system, and services that need to be configured on the system. Smart Framework for Object Groups (SmartFrog) is a system for specifying the configuration, and deployment of distributed applications (Goldsack, P, Guijarro, J, Mecheneau, G, Murray, P, Toft, P, "SmartFrog: Configuration and Automatic Ignition of Distributed Applications," HP OVUA 2003). SmartFrog provides a language to specify the configuration of applications and dependencies between them. SmartFrog provides an infrastructure for processing and deploying applications on the distributed systems. The GridWeaver project is exploring the notion of combining LCFG and SmartFrog technologies for configuration management of large systems. The Organization for the Advancement of Structured Information Standards (OASIS) effort is looking at managing distributed resources using Web services. The Grid Forum is attempting to standardize the specification language as part of the Configuration Description, Deployment, and Lifecycle Management (CDDLM) activity.

Some technologies provide means to monitor individual J2EE components that are participating in providing a service. The technology helps system administrators to monitor performance, identify failures, and check performance bottlenecks.

SUMMARY OF THE INVENTION

The different aspects of the illustrative embodiments provide a computer implemented method, data processing system, and computer usable program code for instantiating a service on a network. The illustrative embodiments receiving a request for the service at a quality of service and responsive to the request determine whether the service is available at the requested quality of service. Responsive to the service being unavailable at the requested quality of service, the illustrative embodiments perform an analysis of components associated with the service to identify resources needed to create the service. Based on the analysis, the illustrative embodiments allocate resources to support the service. Finally, the illustrative embodiments instantiate the service at the requested quality of service after the resources have been allocated.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
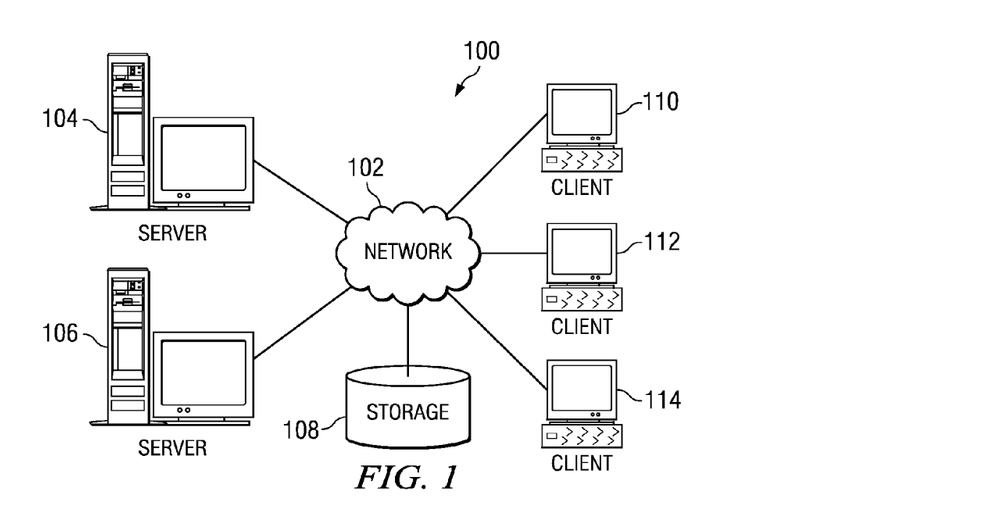
FIG. 1 depicts a pictorial representation of a network of data processing systems in which aspects may be implemented.
Figure 2:
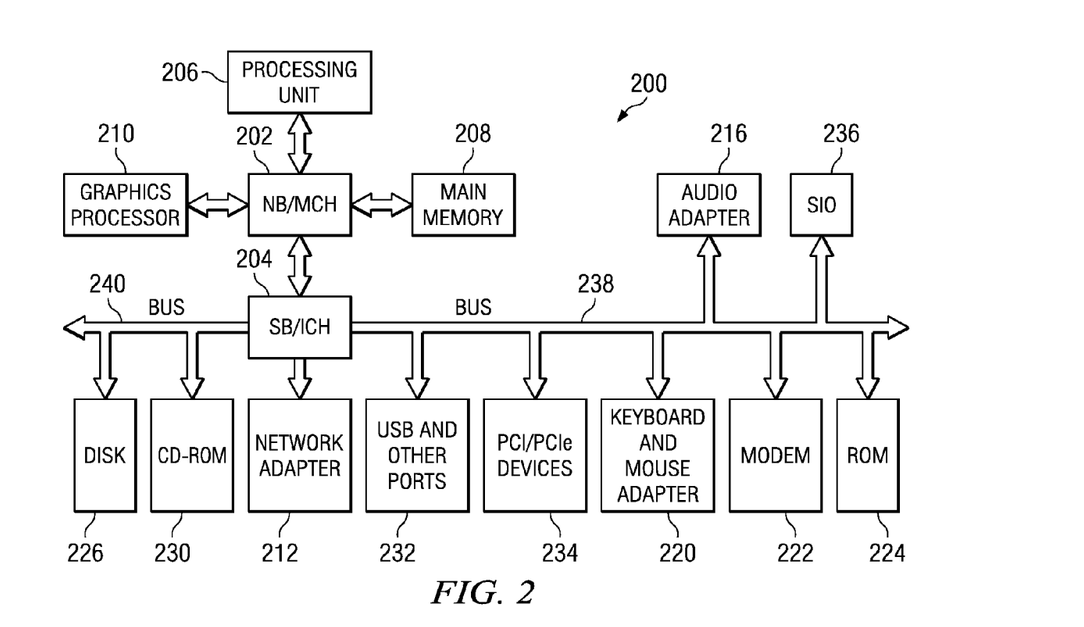
FIG. 2 depicts a block diagram of a data processing system in which aspects may be implemented.

The illustrative embodiments provide middleware that monitors the state of the individual services and automatically triggers the redeployment of components and services to other systems. Service is a unit of activity performed by a compute element. For example, a service could be one that adds two numbers, or one that processes a mortgage loan application. A service is typically exposed as a Web service, or a remote procedure call, for others to invoke and use. With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects of the illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the illustrative embodiments provide for a computer implemented method, apparatus, and computer usable program code for compiling source code. The methods of the illustrative embodiments may be performed in a data processing system, such as data processing system 100 shown in FIG. 1 or data processing system 200 shown in FIG. 2.

The illustrative embodiments instantiate a service on a network. A request is received that requests service at a particular quality of service. Analysis is performed of the components associated with the service to identify resources needed to create the service in response to the service being unavailable at the requested quality of service. Using this analysis, resources are allocated to support the service and the service is instantiated at the requested quality of service after the resources have been allocated.

Figure 3:
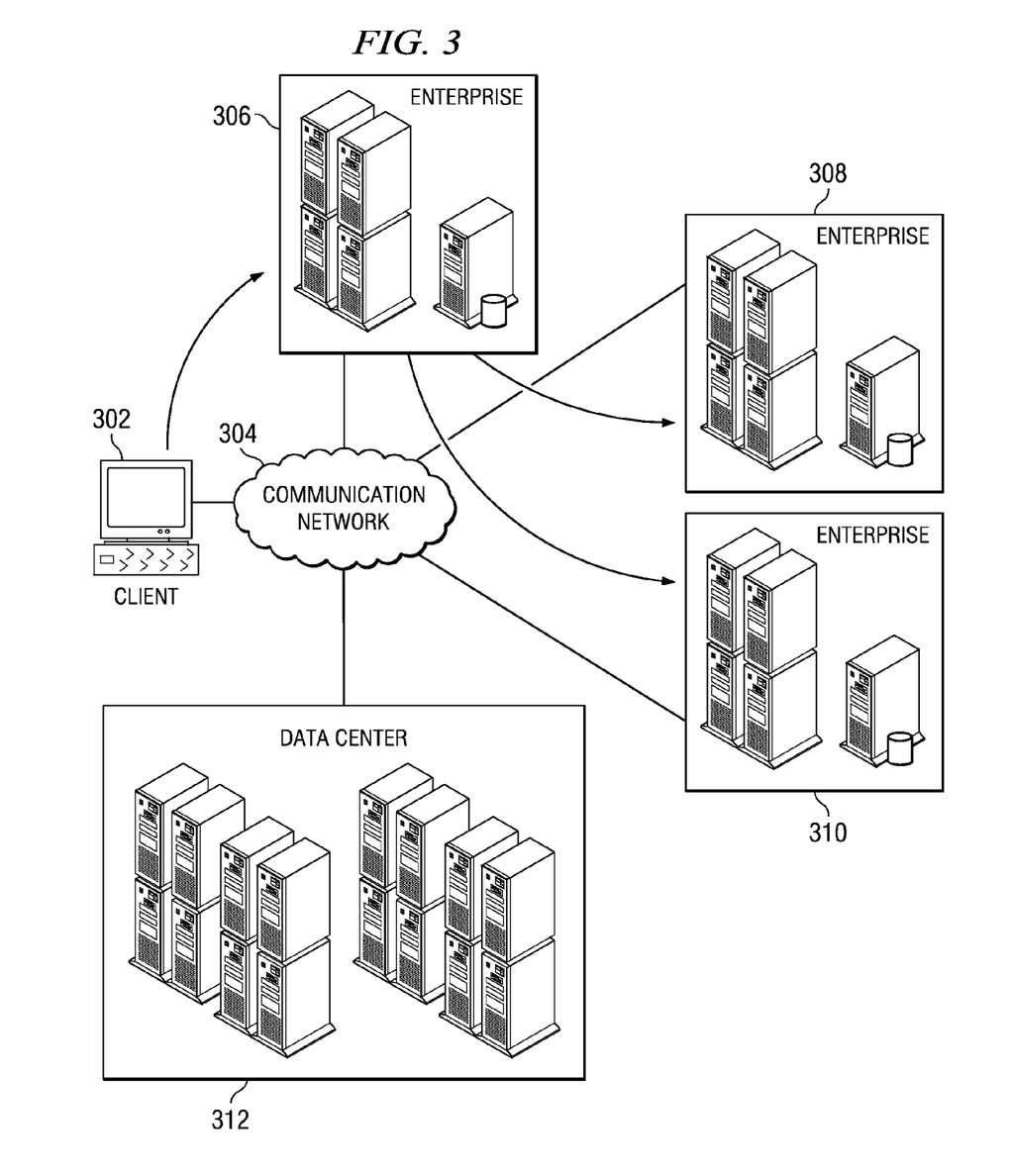
FIG. 3 depicts a schematic representation of a grid environment system in accordance with an illustrative embodiment.

FIG. 3 depicts a schematic representation of a grid environment system in accordance with an illustrative embodiment. A typical grid environment consists of software client 302, such as a browser or a dedicated application, connected to a communication network, such as communication network 304. Software client 302 may be a client, such as client 110, 112, or 114 of FIG. 1, and communication network 304 may be a network, such as network 102 of FIG. 1. Software client 302 utilizes services and resources made available by enterprise 306. These services and resources are in the form of applications, for example, online banking applications or online shopping applications. Further, the applications offered by enterprise 306 might utilize services and resources offered by other enterprises, such as enterprise 308 or 310, which are also connected to communication network 304. Enterprises 306, 308, and 310 use a grid infrastructure for hosting of services and resources.

Data center 312 may provide raw resources, operating system stack, and common middleware services to run applications and application specific middleware services. Data center 312 may provide resources and services that can be configured according to requirements of the higher level services and applications used in enterprises 306, 308, and 310. Data center 312 is typically used when an enterprise 306, 308, or 310 runs out of resources to handle peak load. During these times, enterprise 306, 308, or 310 may request additional resources from data center 312, and divert some of enterprise 306, 308, or 310's workload to data center 312. Data center 312 may also host the applications and provide the necessary supporting services and resources. The illustrative embodiments use the term supporting services to illustrate service components on which one or more other components may depend upon to deliver their service.

Figure 4:
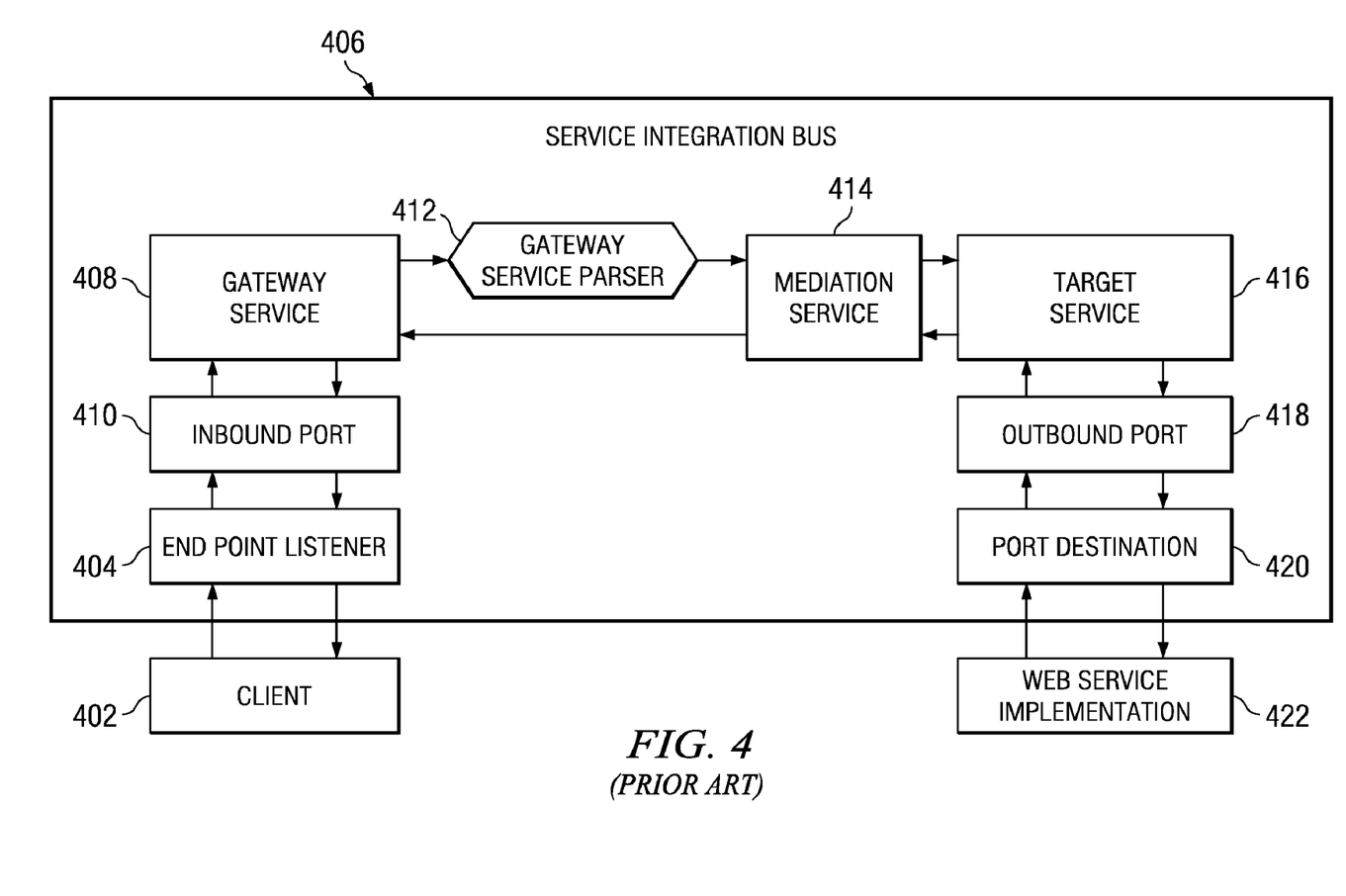
FIG. 4 depicts a typical flow of requests into an enterprise hosting a grid service in accordance with an illustrative embodiment.

FIG. 4 depicts a typical flow of requests into an enterprise hosting a grid service in accordance with an illustrative embodiment. Client 402, which may be a service requester, sends a message to end point listener 404 within service integration bus 406. Client 402 may be a client, such as client 302 of FIG. 3. End point listener 404 receives the request and forwards the request to gateway service 408 on inbound port 410. Gateway service 408 parses the request using gateway service parser 412 to determine which of the internal Web services are hosting the request. The request is then forwarded via mediation service 414 to target service 416 on outbound port 418. Outbound port 418 is connected through port destination 420 to Web service implementation 422 that processes the request. The reply to the request is returned through the reverse path as it was received.

Figure 5:
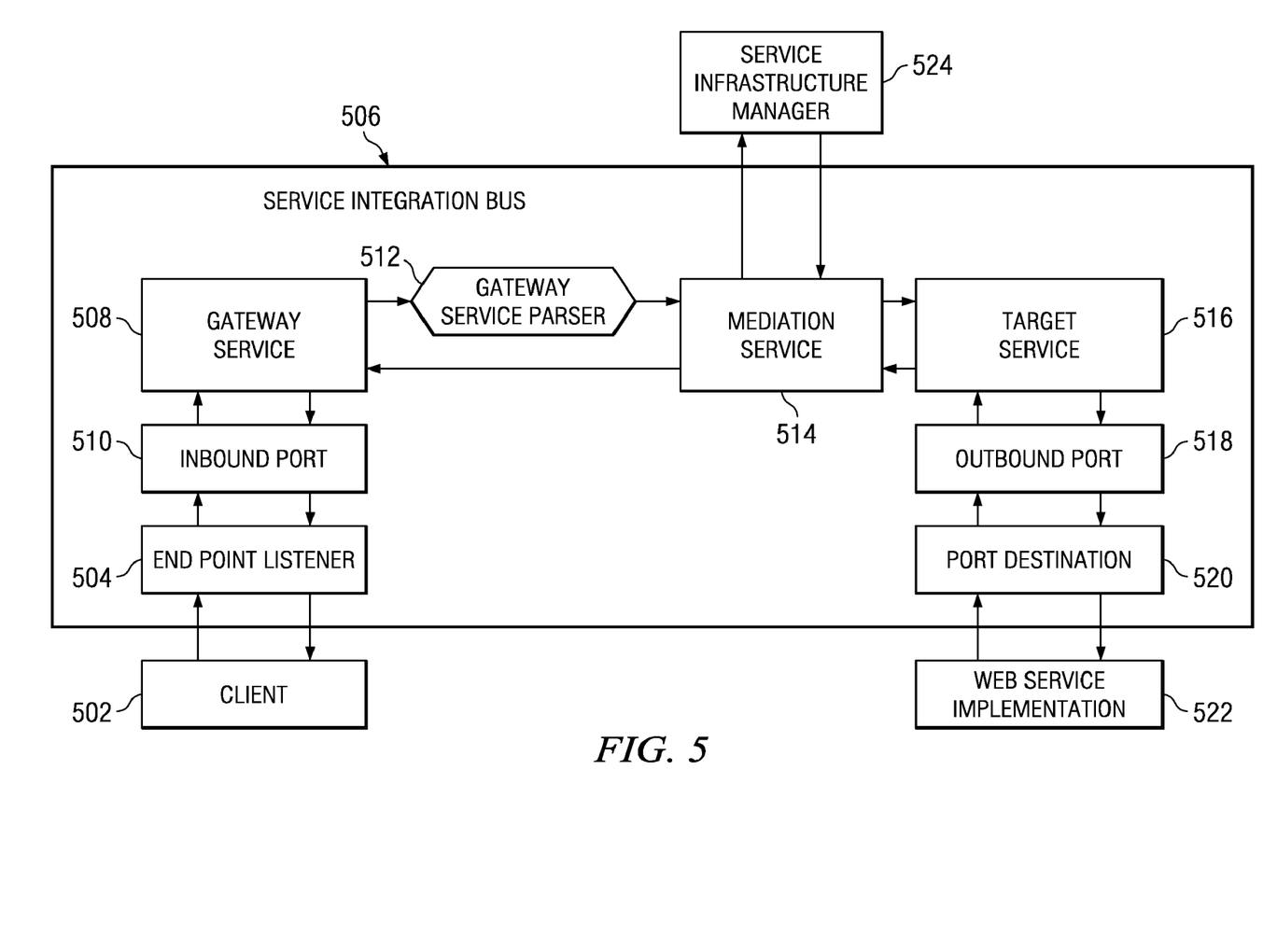
FIG. 5 depicts a relative placement of a service infrastructure manager within a grid service in accordance with an illustrative embodiment.

FIG. 5 depicts a relative placement of a service infrastructure manager within a grid service in accordance with an illustrative embodiment. Client 502, which may be a service requester, sends a message to end point listener 504 through service integration bus 506. Client 502 may be a client, such as client 302 of FIG. 3 and client 402 of FIG. 4. End point listener 504 receives the request and forwards the request to gateway service 508 on inbound port 510. Gateway service 508 parses the request using gateway service parser 512 to determine which of the internal Web services are hosting the request. The request is then forwarded to mediation service 514. Before the request is passed to target service 516 from gateway service 508, the request is routed to service infrastructure manager (SIM) 524 via mediation service 514.

Service infrastructure manager 524 embodies the illustrative embodiments. Service infrastructure manager 524 is responsible for determining if the requested service is running in the grid environment at the capacity level desired by the client request. If the service is not running at all or running at a sub-par level, then the mechanisms within service infrastructure manager 524 initiate steps leading to configuration, allocations, deployments, and testing—unit and integration tests—of components that together compose the necessary service to process the requested service at a desired performance level before the request is passed by mediation service 514 to target service 516.

The functions performed by service infrastructure manager 524 ensure that by the time the requested service is processed by mediation service 514 and arrives at target service 516, target service 516 is ready and capable of providing service at the desired performance level for the client request. Also, the functions performed by service infrastructure manager 524 ensure that: (1) client requests are not dropped due to the absence of a service, and (2) adequate capacity is provisioned before the client request is processed. The request is then forwarded via mediation service 514 to target service 516 on outbound port 518. Outbound port 518 is connected through port destination 520 to Web service implementation 522 that processes the request. The reply to the request is returned through the reverse path as it was received.

Figure 6:
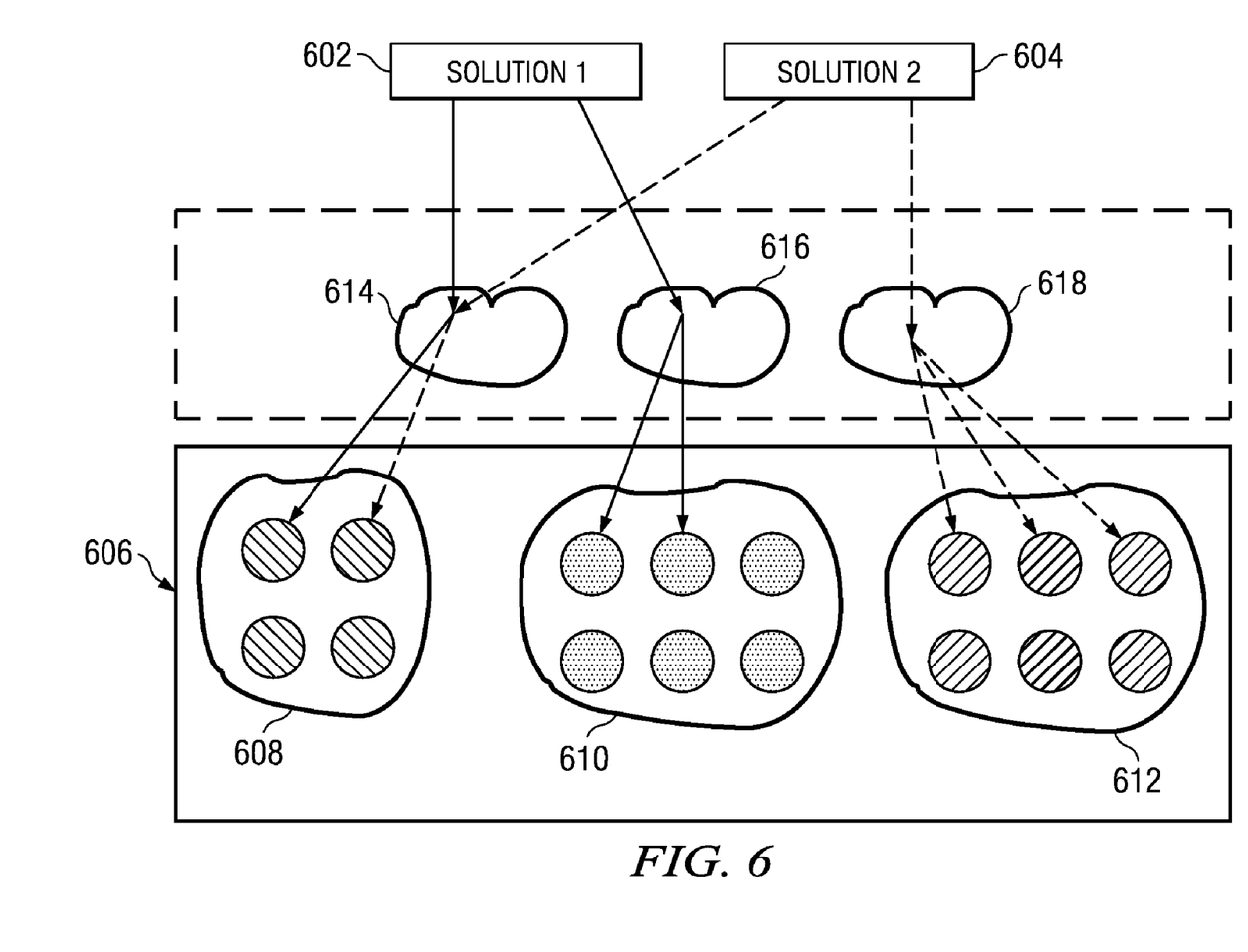
FIG. 6 depicts a schematic representation of the logical architecture of the federated service infrastructure manager middleware and how a solution is mapped to raw resources in the enterprise grid environment through the federated service infrastructure manager middleware in accordance with an illustrative embodiment.

FIG. 6 depicts a schematic representation of the logical architecture of the federated service infrastructure manager middleware and how a solution is mapped to raw resources in the enterprise grid environment through the federated service infrastructure manager middleware in accordance with an illustrative embodiment. Solutions 602 and 604 consist of multiple services that need to be deployed and hosted on grid resources and services 606, including both hardware and software. Grid resources and services 606 are owned and managed by enterprise 608, 610, or 612. Federated service infrastructure manager middlewares 614, 616 and 618 enable the transparent deployment of services and resources in a federated environment. Federated service infrastructure manager middlewares 614, 616 and 618 are middleware such as that contained in service infrastructure manager 524 of FIG. 5.

Figure 7:
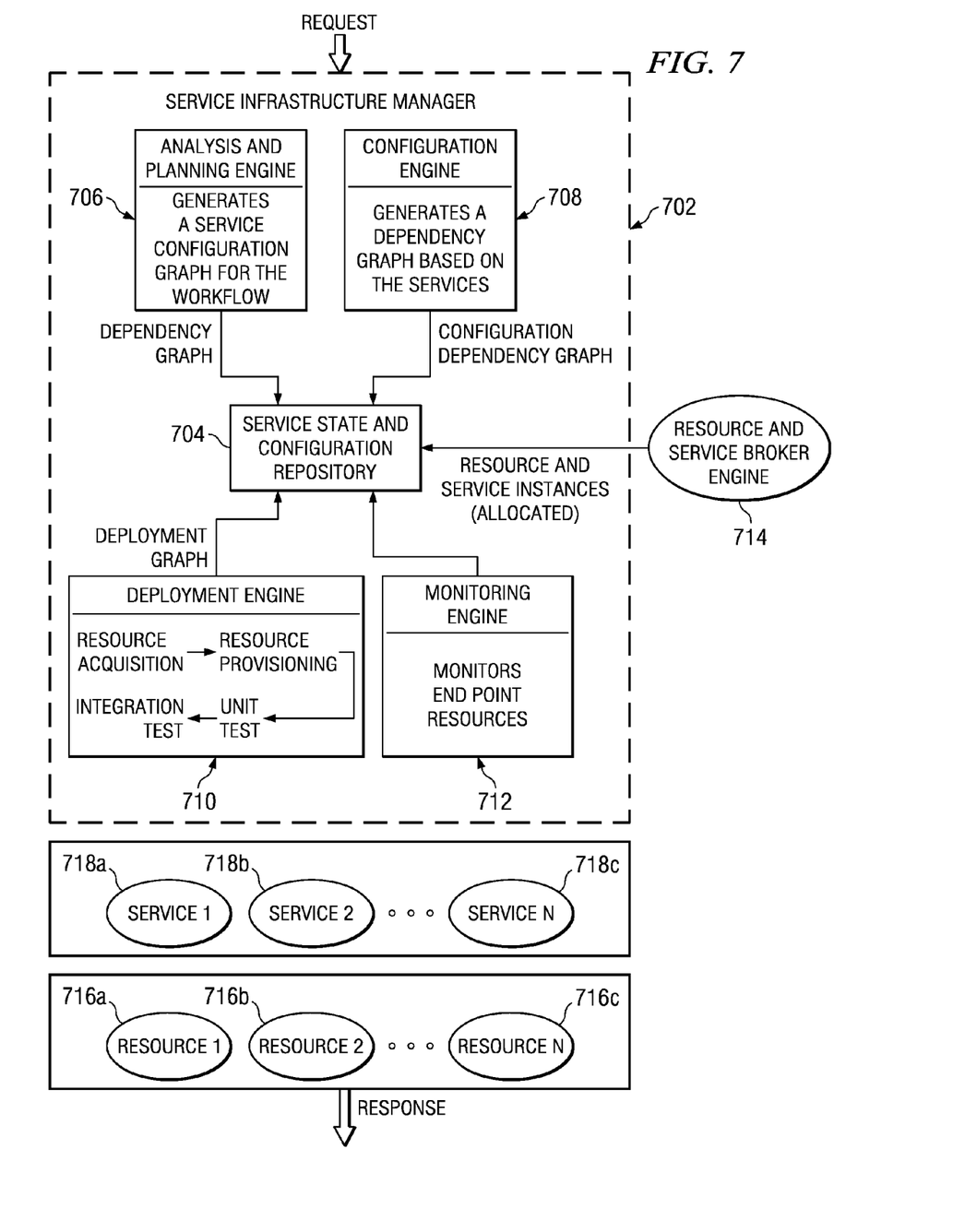
FIG. 7 depicts a schematic representation of the macro-level logical architecture of a service infrastructure manager in accordance with an illustrative embodiment.

FIG. 7 depicts a schematic representation of the macro-level logical architecture of a service infrastructure manager in accordance with an illustrative embodiment. Service infrastructure manager 702 is the set of application programming interfaces (APIs) that service infrastructure manager 702 provides to a mediation service. Service infrastructure manager 702 is a service infrastructure manager, such as service infrastructure manager 524 of FIG. 5. Service infrastructure manager 702 consists of five logical components: service state and configuration repository 704, analysis and planning engine 706, configuration engine 708, deployment engine 710, and monitoring engine 712.

Service state and configuration repository 704 is a core component of service infrastructure manager 702. Each deployable and deployed service is represented as an object in service state and configuration repository 704. In these examples, each object has four parts:

1. state of the service delivered,
2. state of the supporting services,
3. state of the supported services, and
4. configuration and deployment steps that can lead a service component to a specific state.

The first object part lists the service functions that are selected and enabled. For each service function, a description of the observed and expected performance ranges are provided. The second object part lists the actual service instances selected to support this service. The second object part also describes the current usage of each supporting service instance by service, observed state, service level agreements with each service instance, and any violations. Similarly, the third object part lists the actual service instances supported by the service instance, demand placed by those service instances, their observed states, and current usage by the supported services. The third object part also lists any service level agreements with the supported services and any violations. The fourth object part describes steps and procedures to use to configure and deploy the service instance in a particular state. These steps and procedures of the fourth object part are themselves programmable and pluggable at runtime.

When a new service component is to be deployed and enabled, a new service instance object is instantiated in service state and configuration repository 704. The service instance represents the actual service instance to be configured and deployed in the system. Additionally, when a new functionality is to be enabled in an already enabled service, the corresponding service instance object is updated to reflect this new functionality to be enabled. Similarly, if the delivered level of service performance is to be modified, the existing service instance object is modified to reflect this desired level of performance. In all cases, the corresponding service instance objects are assigned a state called a desired state. The state is desired in the actual service instance represented by this object to achieve the desired effect. Also, represented in this object is the current observed state of the service instance. If the observed state of the service instance does not match with the desired state, then the object is flagged for additional processing within service infrastructure manager 702.

A flagged object in service state and configuration repository 704 is first processed by analysis and planning engine 706. Analysis and planning engine 706 performs dependency analysis and generates a dependency graph. Using this dependency graph, analysis and planning engine 706 may enable the service instance to its desired state. Analysis and planning engine 706 then examines service state and configuration repository 704 to determine if any of the existing components may be used to realize the dependency graph. When components do not exist, new instance objects are created in service state and configuration repository 704. The desired state of the existing and newly created instance objects is set to reflect the new demand placed in the said dependency graph. The demands are then recursively analyzed and planned for by analysis and planning engine 706.

Analysis and planning engine 706 first evaluates the dependency graph in a top down manner to determine the actual instances associated with the objects in service state and configuration repository 704. After the dependency graph is evaluated, analysis and planning engine 706 performs a bottom up evaluation to configure and deploy each component to its desired state.

In the first phase, components in the dependency graph are evaluated in a top down manner. For each component with unfulfilled supporting resources, requests are sent to resource and service broker engine 714 with description of the type of service or resource requested along with the desired and necessary attributes. The requests include both functional and performance attributes.

Resource and service broker engine 714 analyzes multiple requests for component resources and services and comes up with a decision to fulfill the requests taking into account existing resource and service specific and system wide policies, priorities, and preferences. The solution provided by analysis and planning engine 706 consists of lower level components from which a service configuration graph may be constructed. Analysis and planning engine 706 constructs a dependency graph that is written into a service configuration section of the object being restored. The allocation and matching decisions provided by analysis and planning engine 706 meet the criteria specified in the received request. When a request cannot be fulfilled, analysis and planning engine 706 holds on to the request until necessary resources and services become available or until the request is cancelled by the requestor. Depending on the nature of the dependency graph and the components returned by resource and service broker engine 714, additional requests may be sent to resource and service broker engine 714 so that each component in the dependency graph has a physical resource or service instance associated with the component.

The dependency graph is then evaluated in a bottom up manner to configure and deploy each component to its desired state. Configuration engine 708 examines the allocated services and instances in a bottom up manner along with the dependencies and the associated state information, both observed and desired. Using this information, configuration engine 708 generates the configuration description for each service instance in the dependency graph. It takes into account the configuration and level of service to be provided by the lower level service instances in the dependency graph and the level of service to be provided to the supported services at the next level up in the dependency graph. Configuration engine 708 generates a configuration dependency graph that describes the order in which the component services and resources are to be deployed and configured. The configuration dependency graph is also stored in the configuration and deployment section, part 4, of the corresponding object and is used by deployment engine 710.

Next, deployment engine 710 uses the configuration dependency graph and the allocated resource/service instances to actually configure and deploy the service instance so the dependency graph can be realized using resources 716a, 716b, and 716c. Deployment engine 710 uses the information provided in the service objects and the configuration dependency graph to create and execute workflows to provision resources and service instances to their desired state. Deployment engine 710 also performs unit and integrity tests on the provisioned and configured services. For each resource, deployment engine 710 uses the configuration dependency graph to initiate the installation and configuration of services 718a, 718b, and 718c on the designated resources. Services 718a, 718b, and 718c running on resources 716a, 716b, and 716c constitute the Web service implementation, such as Web service implementation 524 of FIG. 5.

The progress of the installation and configuration is continuously monitored by monitoring engine 712. Monitoring engine 712 is responsible for updating the status of each representative object in service state and configuration repository 704. If a failure is encountered during unit or integrity testing, then the workflow restarts by performing recovery actions which may include acquiring a new set of resources. In the case of a high level service, after all the resources have been configured, deployment engine 710 notifies service infrastructure manager 702 to enable the service.

Figure 8:
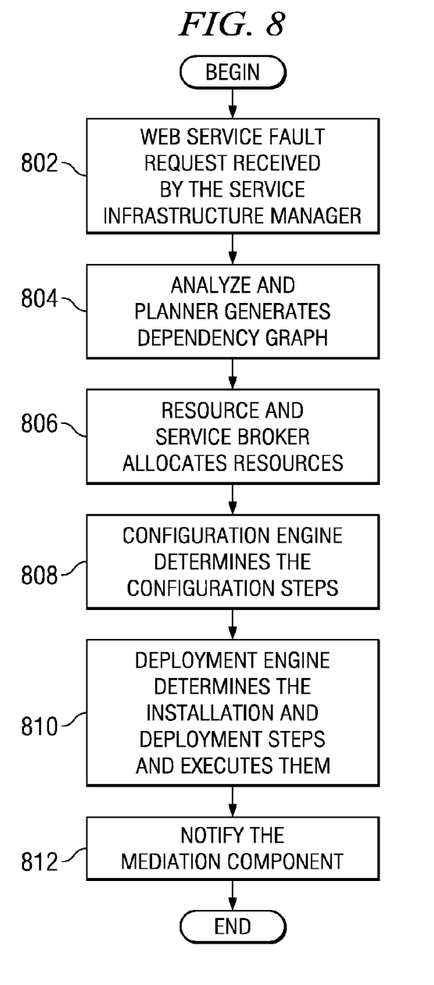
FIG. 8 is a flowchart illustrating the operation of setup and instantiation of a service and associated infrastructure in accordance with an illustrative embodiment.

FIG. 8 is a flowchart illustrating the operation of setup and instantiation of a service and associated infrastructure in accordance with an illustrative embodiment. As the operation begins, a service infrastructure manager, such as service infrastructure manager 702 of FIG. 7, receives a request for a service and determines that the service is not currently running (step 802). Then the components that constitute the service infrastructure manager perform an analysis of components associated with the service to identify resources needed to create the service. The service infrastructure manager may perform at least one of the following steps to ensure that the service is configured, deployed, and ready to process the requests. The service manager may perform only one of the steps, all of the steps, or any number of the steps. An analysis and planning engine generates a dependency graph that aims to arrive at the desired state (step 804). A resource and service broker engine allocates and brokers resources and service instances in the federated system to meet the demands of the dependency graph while conforming to system wide and resource specific policies and priorities (step 806).

A configuration engine determines configuration steps for each allocated and brokered component so they can provide the necessary supporting service at the desired performance level (step 808). The deployment engine determines installation and deployment steps and executes those steps (step 810). After the dependency graph is realized in a bottom up manner and after performing a functional verification test (FVT) on the service requested by the end user, deployment engine sends back the confirmation to a mediation service to indicate the availability of the service (step 812), with the operation ending thereafter.

Figure 9:
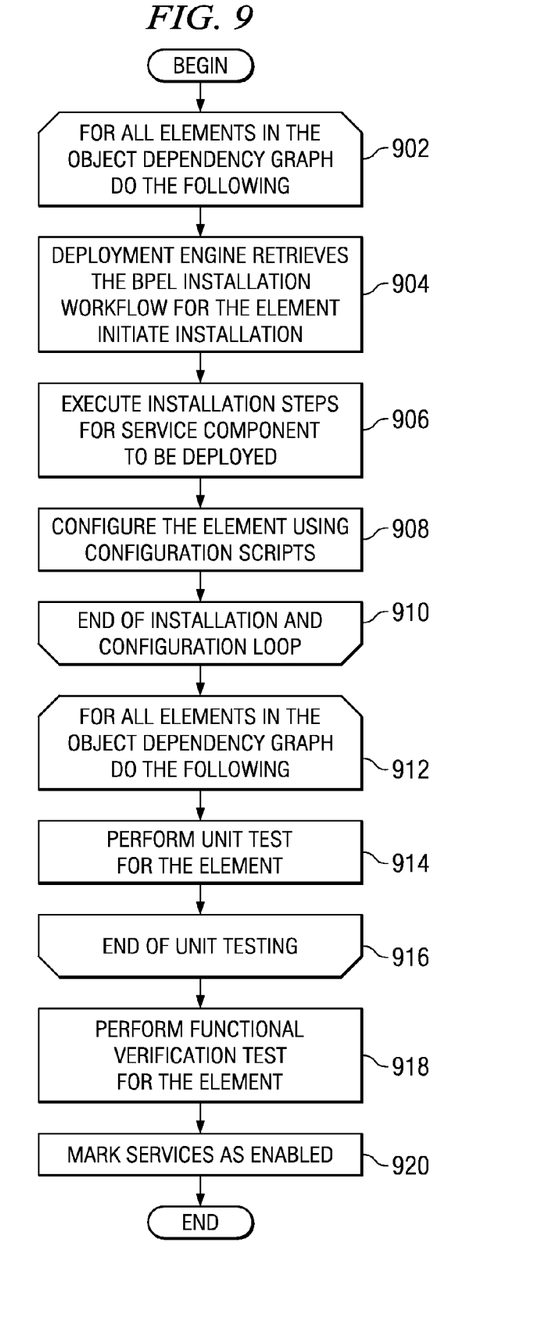
FIG. 9 is a flowchart illustrating the steps performed by a deployment engine in accordance with an illustrative embodiment.

FIG. 9 is a flowchart illustrating the steps performed by a deployment engine in accordance with an illustrative embodiment. The deployment engine, such as deployment engine 710 of FIG. 7, performs these steps in order to complete the installation and deployment of the individual services that are represented as components in the object dependency graph (ODG) for deploying the service requested by the mediation service. As the operation begins, a loop is started for all components in the object dependency graph, the deployment engine retrieves the object dependency graph for the service and identifies all the supporting components in the object dependency graph for the service that need to be installed and configured to enable the service (step 902). If some of the resources and services are already installed, then the deployment engine retrieves the resources and services current configuration parameters to verify if any changes are necessary.

The deployment engine then retrieves the installation workflow for the dependent components that are yet to be installed and prepares for installation (step 904). The installation workflow for each component is stored as a Business Process Execution Language (BPEL) workflow in the service state and configuration repository. The deployment engine then executes the actual installation steps for the service component to be deployed (step 906). If any exceptions are notified, the exceptions are caught and, when possible, corrective actions are taken or alternative deployment actions are applied. If a corrective action is not possible, then the deployment process is aborted and the exception is recorded in the service state and configuration repository associated with the service object that gave rise to the exception.

After the installation of the components is successfully completed, the service infrastructure manager retrieves the configuration information from the object dependency graph for each component, and initiates configuration operation for each component (step 908). For example, the configuration operation for the WebSphere® server includes installation of the enterprise archive (EAR) files for the service and setting up any runtime parameters associated with the corresponding Enterprise Javabeans™ (EJB). Similarly, the DB2® client is configured to bind to the data source that stores information about the payment transactions. The deployment engine may perform installation of all supporting components followed by their configuration, as described above. In another embodiment, it may install and configure one component and then move to the next component. In another embodiment, it may install and configure several components simultaneously and then move to the next group of components.

After the installation and deployment of all components in the object dependency graph is complete (step 910), the deployment engine starts a loop process of performing functional verification tests on the components (step 912). The deployment engine performs a unit test of each installed component (step 914). The scripts for the unit test are stored in the object dependency graph for each component. As an example, the unit test for WebSphere® application server is to check if the application server hosting the service is up. For a HyperText Transfer Protocol (HTTP) server, one unit test is to check if the request sent to port 80 returns successfully. With a DB2® client, one unit test is to check the connectivity of the client with the data source server.

After successful completion of the unit tests the unit testing ends (step 916), deployment engine performs one or more incremental functional verification tests on the deployed service components (step 918). This includes testing successful interactions among components forming sub trees in the object dependency graph. The scripts for the functional verification test are stored with each object in the service state and configuration repository representing a service component in the object dependency graph. After successful completion of the functional verification tests in step 918, the deployment engine marks the service as enabled (step 920), with the operation ending thereafter.

In the embodiments described within FIG. 9, unit tests are performed on all deployed and configured components and this is followed by a suite of functional verification tests. In another embodiment, deployment, configuration, and unit tests of one component may be performed before the next component is installed. In another embodiment, some of these activities may be performed in parallel and other actions may be pipelined. These actions include functional verification tests on sub trees of the object dependency graph.

Thus, the illustrative embodiments provide for instantiating a service on a network. Upon receiving a request for a service at a particular quality of service, a determination is made as to whether the service is available at the requested quality of service. In response to the service being unavailable at the requested quality of service, an analysis is performed of components associated with the service to identify resources needed to create the service and, based on the analysis, resources are allocated to support the service. Then the service is instantiated at the requested quality of service.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a networked computer system for instantiating a service on a network, the method comprising:

responsive to service infrastructure manager middleware receiving a request for the service at a quality of service via the network, determining by a processing unit in the networked computer system communicatively coupled to the service infrastructure manager middleware whether the service is available at the requested quality of service, wherein the service infrastructure manager middleware generates a dependency graph to enable the service at the requested quality of service and generates a configuration dependency graph that defines an order in which allocated components that comprise the service are to be deployed and configured, and wherein the service infrastructure manager middleware retrieves a business process execution language installation workflow to execute installation steps for dependent components not yet installed;

responsive to the service being unavailable at the requested quality of service, performing by the processing unit communicatively coupled to the service infrastructure manager middleware an analysis of components associated with the service to identify resources needed to create the service;

based on the analysis, allocating by the service infrastructure manager middleware resources to support the service; and instantiating by the service infrastructure manager middleware the service on the network at the requested quality of service after the resources have been allocated.

2. The computer implemented method of claim 1, wherein the analysis includes at least one of resource brokering, resource allocation, deployment, installation, configuration, or testing.

3. The computer implemented method of claim 2, wherein the deployment comprises:

identifying the resources for deployment; and deploying a software application on the resources.

4. The computer implemented method of claim 2, wherein the installation comprises:

installing a software application on the resources.

5. The computer implemented method of claim 2, wherein the configuration comprises:

setting parameters of a software application such that the service is available.

6. The computer implemented method of claim 2, wherein the testing comprises:

perform at least one of unit testing or functional verification testing to ensure that the service is correctly working as prescribed by a service provider.

7. The computer implemented method of claim 2, wherein the resource allocation comprises:

allocating resources based upon a service level agreement and system wide policies.

8. The computer implemented method of claim 2, wherein instantiating the service comprises:

employing supporting service and resource components from at least one data center.

9. A data processing system for instantiating a service on a network, the data processing system comprising:
- a bus system;
- a communications system connected to the bus system;
- a memory connected to the bus system, wherein the memory includes a set of instructions; and
- a processing unit connected to the bus system, wherein the processing unit executes the set of instructions to determine by service infrastructure manager middleware whether the service is available at a requested quality of service in response to the service infrastructure manager middleware receiving a request for the service at the requested quality of service via the network, wherein the service infrastructure manager middleware generates a dependency graph to enable the service at the requested quality of service and generates a configuration dependency graph that defines an order in which allocated components that comprise the service are to be deployed and configured, and wherein the service infrastructure manager middleware retrieves a business process execution language installation workflow to execute installation steps for dependent components not yet installed; perform by the service infrastructure manager middleware an analysis of components associated with the service to identify resources needed to create the service in response to the service being unavailable at the requested quality of service; allocate by the service infrastructure manager middleware resources to support the service based on the analysis; and instantiate by the service infrastructure manager middleware the service on the network at the requested quality of service after the resources have been allocated.

10. The data processing system of claim 9, wherein the analysis includes at least one of resource brokering, resource allocation, deployment, installation, configuration, or testing.

11. The data processing system of claim 10, wherein the processing unit executing the set of instructions for deployment includes a set of instructions to identify the resources for deployment; and deploy a software application on the resources.

12. The data processing system of claim 10, wherein the processing unit executing the set of instructions for installation includes a set of instructions to install a software application on the resources.

13. The data processing system of claim 10, wherein the processing unit executing the set of instructions for configuration includes a set of instructions to set parameters of a software application such that the service is available.

14. The data processing system of claim 10, wherein the processing unit executing the set of instructions for testing includes a set of instructions to perform at least one of unit testing or functional verification testing to ensure that the service is correctly working as prescribed by a service provider.

15. A computer program product comprising:
- a tangible computer usable storage medium including computer usable program code to be executed by a computer for instantiating a service on a computer network, the computer program product including:
  - computer usable program code for determining by service infrastructure manager middleware whether the service is available at a requested quality of service in response to the service infrastructure manager middleware receiving a request for the service at the requested quality of service via the network, wherein the service infrastructure manager middleware generates a dependency graph to enable the service at the requested quality of service and generates a configuration dependency graph that defines an order in which allocated components that comprise the service are to be deployed and configured, and wherein the service infrastructure manager middleware retrieves a business process execution language installation workflow to execute installation steps for dependent components not yet installed;
  - computer usable program code for performing by the service infrastructure manager middleware an analysis of components associated with the service to identify resources needed to create the service in response to the service being unavailable at the requested quality of service;
  - computer usable program code for allocating by the service infrastructure manager middleware resources to support the service based on the analysis; and
  - computer usable program code for instantiating by the service infrastructure manager middleware the service on the network at the requested quality of service after the resources have been allocated.

16. The computer program product of claim 15, wherein the analysis includes at least one of resource brokering, resource allocation, deployment, installation, configuration, or testing.

17. The computer program product of claim 16, wherein the computer usable program code for deployment includes:
- computer usable program code for identifying the resources for deployment; and
- computer usable program code for deploying a software application on the resources.

18. The computer program product of claim 16, wherein the computer usable program code for installation includes:
- computer usable program code for installing a software application on the resources.

19. The computer program product of claim 16, wherein the computer usable program code for configuration includes:
- computer usable program code for setting parameters of a software application such that the service is available.

20. The computer program product of claim 16, wherein the computer usable program code for testing includes:
- computer usable program code for performing at least one of unit testing or functional verification testing to ensure that the service is correctly working as prescribed by a service provider.

* * * * *